(12) United States Patent
Mukaide

(10) Patent No.: US 7,884,509 B2
(45) Date of Patent: Feb. 8, 2011

(54) LINEAR MOTOR AND TOOL MOVING DEVICE WITH THE SAME

(75) Inventor: Naomasa Mukaide, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 207 days.

(21) Appl. No.: 12/013,721

(22) Filed: Jan. 14, 2008

(65) Prior Publication Data

US 2008/0258567 A1      Oct. 23, 2008

(30) Foreign Application Priority Data

Feb. 9, 2007      (JP) ............................... 2007-030268

(51) Int. Cl.
H02K 41/02 (2006.01)

(52) U.S. Cl. ............... 310/12.25; 310/12.19; 310/12.24

(58) Field of Classification Search ............. 310/15–24, 310/36–39, 12.24–12.26, 156.07
See application file for complete search history.

(56) References Cited

U.S. PATENT DOCUMENTS

| | | | | |
|---|---|---|---|---|
| 4,945,269 | A * | 7/1990 | Kamm | 310/15 |
| 5,357,158 | A | 10/1994 | Takei | |
| 5,389,844 | A * | 2/1995 | Yarr et al. | 310/15 |
| 6,744,155 | B1 * | 6/2004 | Stoiber | 310/15 |
| 6,917,126 | B2 * | 7/2005 | Tsuboi et al. | 310/12.04 |
| 2005/0046282 | A1 * | 3/2005 | Tang et al. | 310/12 |
| 2006/0181157 | A1 * | 8/2006 | Qiu | 310/12 |
| 2006/0267415 | A1 * | 11/2006 | Qiu | 310/12 |

FOREIGN PATENT DOCUMENTS

JP         5-227729        9/1993

OTHER PUBLICATIONS

U.S. Appl. No. 12/022,398, filed Jan. 30, 2008, Mukaide.

* cited by examiner

*Primary Examiner*—Quyen Leung
*Assistant Examiner*—Eric Johnson
(74) *Attorney, Agent, or Firm*—Oblon, Spivak, McClelland, Maier & Neustadt, L.L.P.

(57) ABSTRACT

A tool moving device with a linear motor is provided with a movable body which is movable bodily with a tool on a support frame through a pair of fluid bearings. A plurality of magnet constructs are circumferentially arranged on the movable body to respectively face stationary coils secured to the support frame. Each of the magnet constructs comprises at least one pair of magnet members juxtaposed in the moving direction of the magnet yoke and arranged with their polarities of magnet pole being opposite to each other, wherein respective pairs of the magnet members attached to the circumferential surface form first and second rows spaced from each other in the moving direction of the magnet yoke. Each magnet member in each of the first and second rows is arranged to be opposite in polarity of magnet pole to each of the magnet members next thereto in the circumferential direction.

5 Claims, 4 Drawing Sheets

LINEAR MOTOR AND TOOL MOVING DEVICE WITH THE SAME

INCORPORATION BY REFERENCE

This application is based on and claims priority under 35 U.S.C. 119 with respect to Japanese patent application No. 2007-030268 filed on Feb. 9, 2007, the entire content of which is incorporated herein by reference.

BACKGROUND OF THE INVENTION

1. Field of the Invention

The present invention relates to a linear motor of the moving-magnet type and a tool moving device provided with the linear motor. Particularly, it relates to a linear motor in which a magnet yoke is made to be thinner for a lighter moving part, and a tool moving device provided with such a linear motor.

2. Discussion of the Related Art

Generally, as described in, for example, U.S. Pat. No. 5,357,158 (equivalent of Japanese unexamined published patent application No. 5-227729), a linear motor is composed of a primary side and a secondary side. The primary side includes a rectangular plate-like coil yoke 25 provided on a rail track 11 to extend over the entire length of the rail track and a plurality of armature coils 26 arranged on the coil yoke to make a line, whereas the secondary side includes a magnet yoke 32 secured to a lower surface of a sliding unit 13 slidable on the rail track and a rectangular plate-like field magnet 33 secured to a lower surface of the magnet yoke to face the armature coils 26.

The field magnet 33 has been magnetized to arrange a plurality of N and S magnetic poles in an alternate fashion in the sliding direction of the sliding unit. With predetermined electric current applied to the field coils, a propelling force according to Fleming's left-hand rule is generated between the primary side and the secondary side, whereby the sliding unit is slidden on the rail track.

In the linear motor of this kind, the propelling force acting on a movable body (like the aforementioned sliding unit) is determined in dependence on the direction and the magnitude of the electric current supplied to the field coils. In the prior art linear motor described in the aforementioned patent, all the magnetic flux depending on the electric current supplied to the field coils passes the magnet yoke, and hence, the magnet yoke has to have the minimum cross-section which does not cause magnetic saturation of the magnetic flux to take place. That is, the magnet yoke should have the thickness which depends on the magnitude of the magnetic flux passing therethrough, so that the linear motor is increased in dimension and weight. In addition, in order to increase the power of the linear motor, a plurality of magnet members have to be arranged, and therefore, in a liner motor of the moving-magnet type, a problem arises in that the linear motor is increased in dimension and weight more and more.

SUMMARY OF THE INVENTION

It is therefore a primary object of the present invention to provide a linear motor in which a magnetic yoke can be made to be thin for a lighter moving part by arranging magnets so that the magnetic flux passing through a magnetic yoke can be branched, and to provide a tool moving device provided with such a linear motor.

Briefly, according to the present invention, there is provided a linear motor, which comprises a movable magnet yoke taking a hollow shape, a plurality of magnet constructs attached to a circumferential surface of the magnet yoke at an equiangular distance, coil yokes to which to the magnet yoke is relatively movable, and a plurality of coils attached respectively to the coil yokes and arranged to respectively face the plurality of magnet constructs. Each of the magnet constructs comprises at least one pair of magnet members juxtaposed in the moving direction of the magnet yoke and arranged with their polarities of magnet pole being opposite to each other. Respective pairs of the magnet members attached to the circumferential surface form first and second rows spaced from each other in the moving direction of the magnet yoke. Each magnet member in the first row is arranged to be opposite in polarity of magnet pole to each of the magnet members next thereto in the circumferential direction, and each magnet member in the second row is arranged to be also opposite in polarity of magnet pole to each of the magnet members next thereto in the circumferential direction.

With this construction, each of the magnet constructs attached to the magnet yoke to be spaced in the circumferential direction comprises at least one pair of magnet members juxtaposed in the moving direction of the magnet yoke and arranged with their polarities of magnet pole being opposite to each other. Each magnet member in each of the first and second rows is arranged to be opposite in polarity of magnet pole to each of the magnet members next thereto in the circumferential direction. Thus, the magnetic flux generated with the supply of electric current to each coil is branched in two directions along the circumferential surface of the magnet yoke as well as in a direction normal to the two directions, so that the magnetic flux passing through the magnet yoke can be distributed into three. Therefore, the magnet yoke can be made to be thin in thickness, and thus, the linear motor can be downsized and lightened though it is of the moving-magnet type.

In another aspect of the present invention, there is provided a tool moving device, which comprises a movable body composed of a movable magnet yoke taking a hollow shape and support portions provided at opposite end portions of the magnet yoke, a support frame supporting the movable body to be movable relative thereto, and a pair of fluid bearings provided in the support frame and respectively supporting the opposite end support portions of the movable body through a static pressure of fluid. The tool moving device further comprises a plurality of magnet constructs attached to a circumferential surface of the magnet yoke at an equiangular distance, coil yokes attached to the support frame, a plurality of coils attached respectively to the coil yokes and arranged to respectively face the plurality of magnet constructs, a displacement detector for detecting the moving displacement of the movable body, and a tool holder unit attached to the movable body. Each of the magnet constructs comprises at least one pair of magnet members juxtaposed in the moving direction of the magnet yoke and arranged with their polarities of magnet pole being opposite to each other. Respective pairs of the magnet members attached to the circumferential surface form first and second rows spaced from each other in the moving direction of the magnet yoke. Each magnet member in the first row is arranged to be opposite in polarity of magnet pole to each of the magnet members next thereto in the circumferential direction, and each magnet member in the second row is arranged to be also opposite in polarity of magnet pole to each of the magnet members next thereto in the circumferential direction.

With this configuration, the tool moving device is provided with the movable body composed of the movable magnet yoke taking the hollow shape and the support portions provided at opposite end portions of the magnet yoke, the support frame supporting the movable body to be movable relative thereto, the fluid bearings provided in the support frame and respectively supporting the opposite end support portions of the movable body through a static pressure of fluid, the plurality of magnet constructs attached to the circumferential surface of the magnet yoke at the equiangular distance, the coil yokes attached to the support frame, the plurality of coils attached respectively to the coil yokes and arranged to respectively face the plurality of magnet constructs, the displacement detector for detecting the moving displacement of the movable body, and the tool holder unit attached to the movable body. Since the plurality of magnet constructs take the same construction as the linear motor as described above, the magnetic flux passing through the magnet yoke can be branched into three, and the magnet yoke can be made to be thin in thickness. Therefore, it can be accomplished to downsize and lighten the tool moving device.

BRIEF DESCRIPTION OF THE DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENTS

Figure 1:
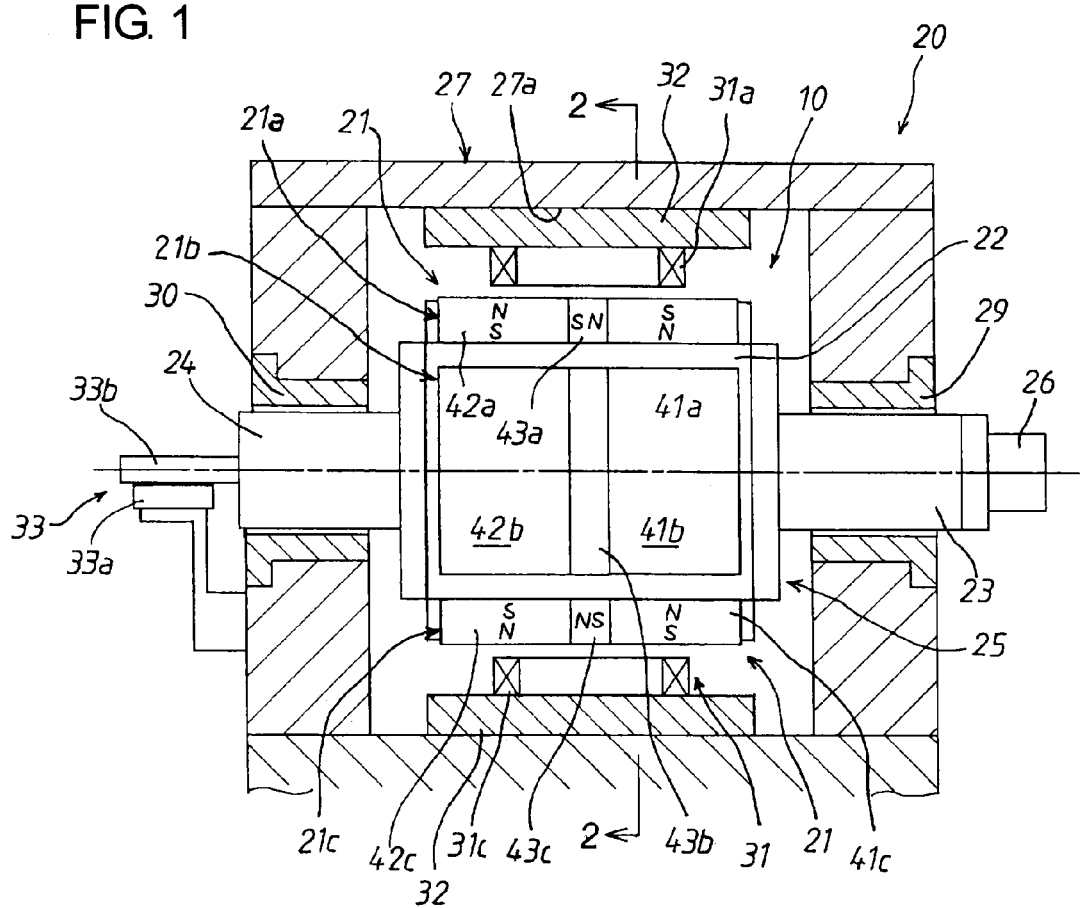
FIG. 1 is a schematic view in longitudinal section of a tool moving device provided with a linear motor in one embodiment according to the present invention.

Hereafter, an embodiment according to the present invention will be described with reference to the accompanying drawings. FIG. 1 shows a tool moving device 20 provided with a linear motor 10 of the moving-magnet type. The linear motor 10 comprises a voice coil motor which is composed of primary components on a stationary side and secondary components on a moving side movable relative to the primary components.

The tool moving device 20 is provided with a movable body 25 which is composed of a magnet yoke 22 made of a magnetic material and taking the shape of a hollow or empty box, a plurality of magnet constructs 21 (21a-21d) made of permanent magnets attached to the circumferential surface of the magnet yoke 22, and a pair of support portions 23, 24 rectangular in cross-section which are respectively attached to opposite opening portions of the magnet yoke 22. The movable body 25 constitutes the secondary components of the linear motor 10. A tool holder unit 26 holding a bite or the like for machining a workpiece precisely is attached to an extreme end of one of support portions 23 of the movable body 25.

Further, the tool moving device 20 is provided with a support frame 27 made of, e.g., a non-magnetic material which is mounted fixedly relative to the movable body 25. The support frame 27 is provided with a pair of fluid bearings 29, 30 which support the respective support portions 23, 24 of the movable body 25 to be slidable only in an X-axis direction (i.e., in a direction along the axis of an empty space in the movable body 25) through a static pressure of fluid like oil. An empty box-like chamber 27a is formed in the support frame 27 to surround the magnet yoke 22, and a plurality of coil yokes 32 attached to the interior surface of the empty box-like chamber 27a to face the circumferential surfaces of the magnet yoke 22. Stationary coils 31 (31a-31d) are attached to these coil yokes 32 to face the magnet constructs 21, respectively. The coil yokes 32 with the stationary coils 31 constitute the secondary components of the linear motor 10.

The displacement amount of the movable body 25 in the X-axis direction is detected by a linear scale 33 comprising a fixed scale 33a and a movable scale 33b movable relative to the fixed scale 33a. The fixed scale 33a is secured to the support frame 27, while the movable scale 33b is attached to a center part of the support portion 24 of the movable body 25.

Figure 2:
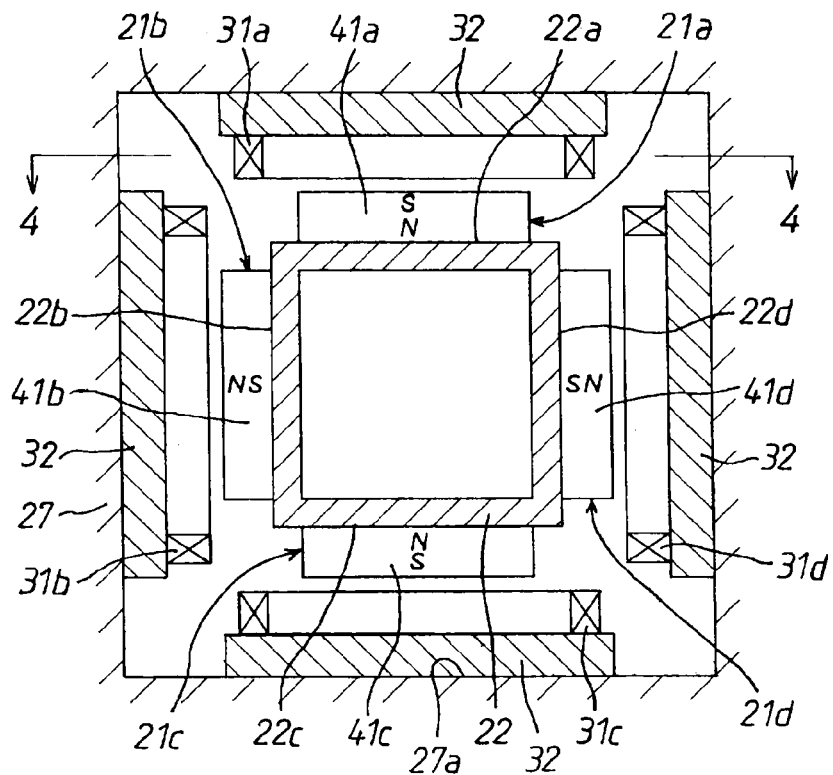
FIG. 2 is a cross-sectional view taken along the line 2-2 in FIG. 1.
Figure 3:
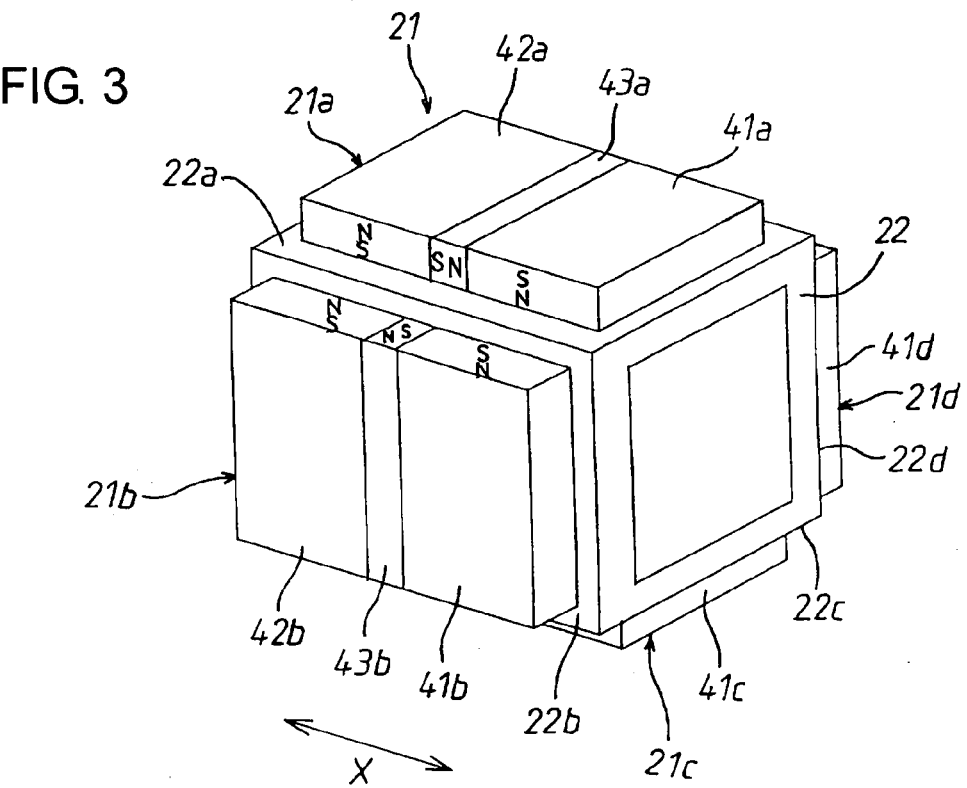
FIG. 3 is a perspective view depicting a moving part of the linear motor shown in FIG. 1.

As shown in FIG. 2, the magnet yoke 22 taking the shape of an empty box is configured to be a regular tetragon in cross-section and has first through fourth magnet constructs 21a-21d attached respectively to four external flat surfaces 22a-22d. As shown in FIGS. 1 and 3, the magnet constructs 21a-21d include respective pairs of magnet members 41a, 42a; 41b, 42b; 41c, 42c; 41d, 42d, those of each pair of which are juxtaposed in the X-axis direction with their polarities of magnet pole directed in opposite directions, and auxiliary magnets 43a-43d each of which is interposed between the associated pair of the magnet members. Each of the magnet members 41a, 42a, 41b, 42b, 41c, 42c, 41d, 42d takes the form of a rectangular parallelepiped with the short sides extending in the X-axis direction, and the magnet members 41a, 42a, 41b, 42b, 41c, 42c, 41d, 42d all take the same shape.

Specifically, a first magnet construct 21a is attached to a first magnet attaching surface 22a of the magnet yoke 22, and one (the magnet member 41a on the right side in FIG. 3) of the paired magnet members 41a, 42a is attached to make the N-pole side face the first magnet attaching surface 22a of the magnet yoke 22 and to make the S-pole side face the stationary coil 31a. Further, the other (the magnet member 42a on the left side in FIG. 3) of the paired magnet members 41a, 42a is attached to make the S-pole side face the first magnet attaching surface 22a of the magnet yoke 22 and to make the N-pole side face the stationary coil 31a. The auxiliary magnet 43a interposed between the pair of magnet members 41a, 42a acts to prevent lines of magnetic force passing between the pair of magnet members 41a, 42a from diffusing and hence, to intensify the magnetic field.

Hereafter, for convenience in explanation, of the paired magnet members 41a, 42a juxtaposed with a space therebetween in the X-axis direction, one on the right side in FIG. 1 (on the tool holder unit 26 side) will be referred to as "first row magnet member" or "magnet member in the first row", whereas the other on the left side (the linear scale 33 side) will be referred to as "second row magnet member" or "magnet member in the second row".

Second and fourth magnet attaching surfaces 22b, 22d of the magnet yoke 22 which are adjacent to the first magnet attaching surface 22a about the X-axis respectively attach second and fourth magnet constructs 21b, 21d thereto.

Respective pairs of the magnet members 41*b*, 42*b*; 41*d*, 42*d* of the magnet constructs 21*b*, 21*d* take the same shape as the aforementioned pair of magnet members 41*a*, 42*a*, and each paired magnet members 41*b*, 42*b*; 41*d*, 42*d* are juxtaposed with a predetermined space therebetween in the X-axis direction to direct their polarities of magnetic poles in opposite directions to each other. In addition, of the respective pairs of magnet members 41*b*, 42*b*; 41*d*, 42*d* attached respectively to the second and fourth magnet attaching surfaces 22*b*, 22*d*, the respective magnet members 41*b*, 41*d* in the first row are attached to make their S-pole sides face the second and fourth magnet attaching surfaces 22*b*, 22*d* of the magnet yoke 22 and to make their N-pole sides face the stationary coil 31*b*, 31*d* sides, while the respective magnet members 42*b*, 42*d* in the second row are attached to make their N-pole sides face the second and fourth magnet attaching surfaces 22*b*, 22*d* of the magnet yoke 22 and to make their S-pole sides face to the stationary coil 31*b*, 31*d* sides.

Further, a third magnet construct 21*c* is attached to a third magnet attaching surface 22*c* of the magnet yoke 22, the third magnet attaching surface 22*c* being opposite to the first magnet attaching surface 22*a* and being adjacent or next to the second and fourth magnet attaching surfaces 22*b*, 22*d* about the X-axis. Of the pair of magnet members 41*c*, 42*c* of the third magnet construct 21*c*, the magnet member 41*c* in the first row is attached to make its N-pole side face the third magnet attaching surface 22*c* of the magnet yoke 22 and to make its S-pole side face the stationary coil 31*c* side, while the magnet member 42*c* in the second row is attached to make its S-pole side face the third magnet attaching surface 22*c* of the magnet yoke 22 and to make its N-pole side face the stationary coil 31*c* side.

In this manner, with respect to the first through fourth magnet constructs 21*a*-21*d* which are arranged on the four magnet attaching surfaces 22*a*-22*d* of the magnet yoke 22, each of the magnet members 41*a*-41*d* in the first row is arranged with its polarity of magnet pole directed in opposite to that of the magnet member in the second row next thereto in the X-axis and also in opposite to those of the magnet members in the first row next thereto about the X-axis. Likewise, each of the magnet members 42*a*-42*d* in the second row is arranged with its polarity of magnet pole directed in opposite to that of the magnet member in the first row next thereto in the X-axis and also in opposite to those of the magnet members in the second row next thereto about the X-axis.

Figure 4:
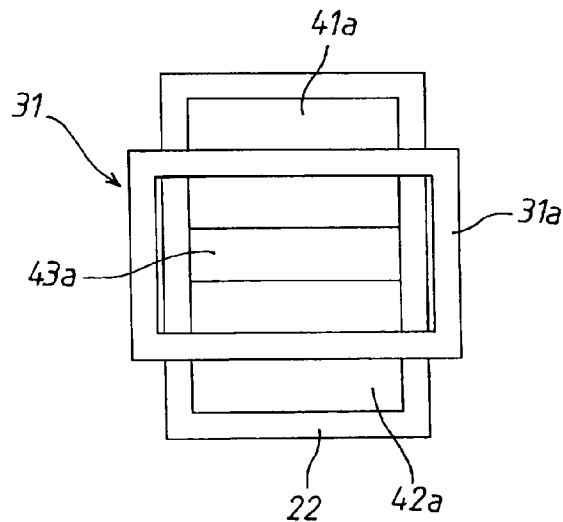
FIG. 4 is a sectional view taken along the line 4-4 in FIG. 2.

As best shown in FIG. 2, the stationary coils 31 include the first through fourth coil members 31*a*-31*d* which respectively face the respective pairs of the magnet members 41*a*, 42*a* through 41*d*, 42*d* constituting the first through fourth magnet constructs 21*a*-21*d*. As schematically illustrated in FIG. 4 typically for the coil member 31*a*, each of the coil members 31*a*-31*d* is configured by repetitively winding a coil wire in a parallel fashion to form a rectangular loop which extends over an associated one pair of the magnet members 41*a*, 42*a* through 41*d*, 42*d*.

Next, the operation of the linear motor 10 and the tool moving device 20 provided with the same in the aforementioned embodiment will be described hereinafter. When predetermined electric current is applied to the respective coil members 31*a*-31*d* of the stationary coils 31, lines of magnet force are generated through each pair of the magnet members 41*a*, 42*a* through 41*d*, 42*d* of the magnet constructs 21*a*-21*d*, which induce a propelling force of the movable body 25 in accordance with Fleming's left-hand rule, whereby the movable body 25 is moved in a forward or backward direction along the X-axis depending on the direction in which the electric current is supplied, as it is hydrostatically supported by the fluid bearings 29, 30.

Figure 5A:
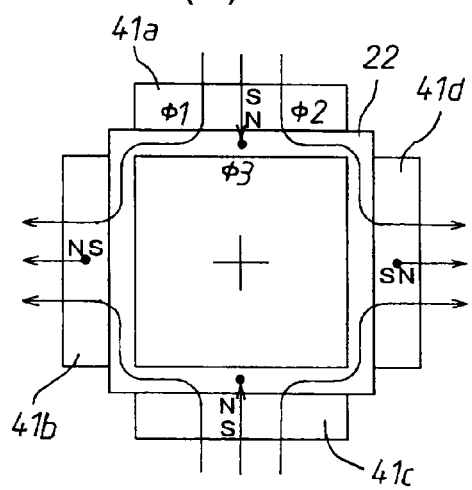
FIGS. 5(A)-(D) are explanatory views for explaining the operation of the linear motor in the embodiment according to the present invention.

At this time, with electric current applied to the respective coil members 31*a*-31*d*, the lines of magnetic force are generated from, for example, the first row magnet member 41*a* which is of the paired magnet members 41*a*, 42*a* of the first magnet construct 21*a* attached to the first magnet attaching surface 22*a* of the magnet yoke 22 and which is attached with its N-pole facing the first magnet attaching surface 22*a*. As indicated by the arrows φ1 and φ2 in FIG. 5(A), the lines of magnetic force are branched in circumferentially opposite directions from the first magnet attaching surface 22*a* toward the second and fourth magnet attaching surfaces 22*b*, 22*d*. These lines of magnetic force form magnetic circuits passing through the first row magnet members 41*b*, 41*d* which are attached with their S-poles facing the second and fourth magnet attaching surfaces 22*b*, 22*d*. At the same time, as indicated by the arrow φ3 in FIG. 5 (C), some of the lines of magnetic force acting on the first magnet attaching surface 22*a* of the magnet yoke 22 also pass through the magnet yoke 22 in the X-axis direction from the first row side toward the second row side, whereby another magnetic circuit is formed to pass through the second row magnet member 42*a* of the first magnet construct 21*a* which member 42*a* is attached with its S-pole side facing the first magnet attaching surface 22*a* of the magnet yoke 22.

That is, a magnetic flux which is generated from one pole (N-pole) of the first row magnet member 41*a* of the first magnet construct 21*a* is branched from the first magnet attaching surface 22*a* of the magnet yoke 22 in three directions including the X-axis direction and two other directions perpendicular to the X-axis direction. Thus, the magnetic flux passing through each part of the magnet yoke 22 becomes approximately one third (⅓) of the whole magnetic flux. As a result, it can be realized to decrease the thickness of the magnet yoke 22 which should be given to make the density of the magnetic flux uniform, to approximately one third (⅓) in comparison with the prior art in which the whole of such magnet flux passes in one direction only, and hence, it can be accomplished to lighten the movable body 25.

The aforementioned explanation has been referred to the magnetic flux which is generated from the first row magnet member 41*a* of the first magnet construct 21*a*, and the same magnetic circuits as mentioned above can be formed by each of the magnetic fluxes which are generated respectively from the second row magnet member 42*b* of the second magnet construct 21*b*, the first row magnet member 41*c* of the third magnet construct 21*c* and the second row magnet member 42*d* of the fourth magnet construct 21*d*. Therefore, at any part of the magnet yoke 22, the magnetic flux passing through the magnet yoke 22 can be decreased to approximately one third (⅓) of the whole magnetic flux which passes through each of the magnet members 41*a*, 42*a* through 41*d*, 42*d*.

Figure 5B:
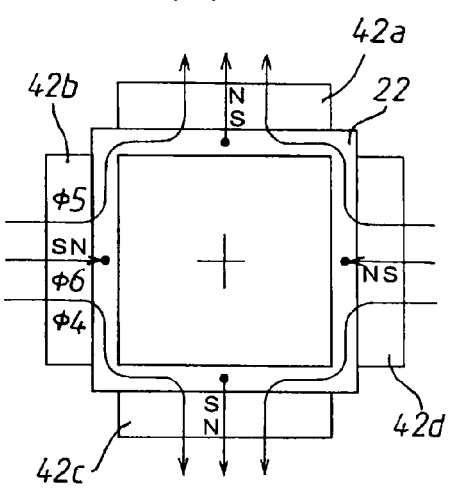
Figure 5C:
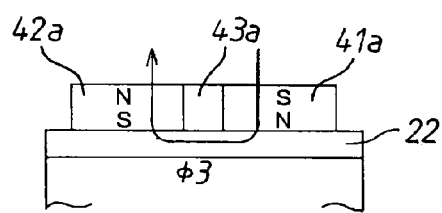
Figure 5D:
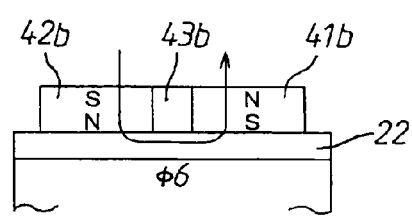

For example, as shown in FIG. 5(B), the magnetic flux generated from the second row magnet member 42*b* of the second magnet construct 21*b* first makes a magnetic flux φ4 which passes through the second row magnet member 42*c* of the third magnet construct 21*c* by way of the magnet yoke 22, and second makes another magnetic flux φ5 which passes through the second row magnet member 42*a* of the first magnet construct 21*a* by way of the magnet yoke 22. Third, as shown in FIG. 5(D), the magnetic flux generated from the second row magnet member 42*b* of the second magnet construct 21*b* makes another magnetic flux φ6 which passes through the magnet yoke 22 from the second row side toward the first row side in the X-axis direction.

The moving amount of the movable body 25 is detected by the linear scale 33, and a detection signal of the linear scale 33 is inputted to a controller (not shown) to be compared with a target value which has been programmed in the controller in advance. When the movable body 25 is moved to a target position designated by the target value, the direction in which the electric current is applied to the stationary coils 31 is reversed, whereby the movable body 25 is positioned to a predetermined position or is moved in a direction opposite to the aforementioned moving direction.

In this way, the movable body 25 is moved in the X-axis direction by the propelling force which is generated in dependence on the direction and the magnitude of the electric current applied to the stationary coils 31, while the position of the movable body 25 is controlled based on the detection signal of the linear scale 33. Thus, the bite or the like which is held on the tool holder unit 26 attached to the movable body 25 is moved finely at a high speed, whereby a high precision cutting can be performed on the workpiece. During this time, since the movable body 25 is supported with a static pressure of fluid which is generated at the fluid bearings 29, 30, it becomes possible to perform the fine and high-speed feed control of the bite or the like stably, so that the machining accuracy of the workpiece can be enhanced.

In the foregoing embodiment, description has been made taking an example wherein the linear motor 10 according to the present invention is applied to the tool moving device 20 which moves the bite or the like held on the tool holder unit 26 finely at a high speed. However, the linear motor 10 according to the present invention is not limited to the application to the tool moving device 20 and is applicable to a general moving device for moving a movable body back and forth.

Figure 6:
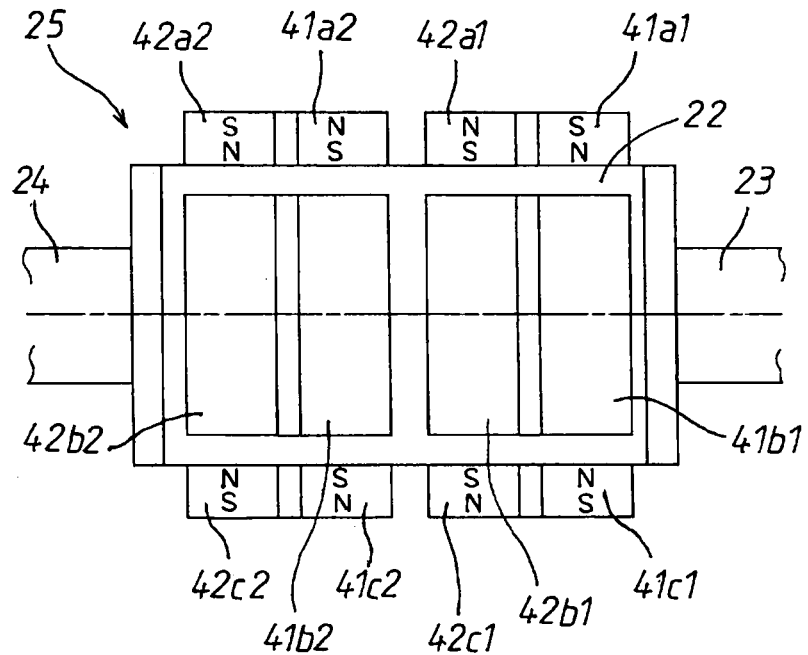
FIG. 6 is a schematic view showing a moving part of a linear motor in a modification according to the present invention.

Further, in the foregoing embodiment, description has been made taking an example wherein the respective pairs of magnet members 41a, 42a; 41b, 42b; 41c, 42c; 41d, 42d are juxtaposed on the respective magnet attaching surfaces 22a-22d of the magnet yoke 22. In a modified form, as shown in FIG. 6, two pairs of magnet members may be juxtaposed on each of the four magnet attaching surfaces 22a-22d. That is, respective quartets (or respective two pairs) of magnet members 41a1, 42a1, 41a2, 42a2 through 41d1, 42d1, 41d2, 42d2 may be arranged respectively on the four magnet attaching surfaces 22a-22d. In this modified form, it is desirable that the two magnet members 42a1, 41a2; 42b1, 41b2; 42c1, 41c2; or 42d1, 41d2 which are arranged inside in each of the quartets (i.e., in respective two pairs) may be arranged with the same polarity in the magnetic pole so that the leakage of a magnetic flux becomes hard to occur between the respective adjoining magnet members 42a1, 41a2; 42b1, 41b2; 42c1, 41c2; or 42d1, 41d2. In this modified form, four pairs of coil members (eight coils in total: not shown) are provided respectively on the four stationary sides for each pair to respectively face the associated two pairs of magnet members.

Thus, by applying electric current to the respective pairs of coil members which are associated respectively with the quartets of magnet members to provide the movable body 25 with the propelling forces in the same direction, the propelling power given to the movable body 25 can be increased to approximately double. Off course, it is possible to arrange three or more pairs of magnet members on each of the magnet attaching surfaces 22a-22d in the X-axis direction and to arrange on the stationary side three or more number of coil members each associated with each pair of magnet members.

In the foregoing embodiment, description has been made taking an example wherein the magnet yoke 22 of a regular tetragon in cross-section is used having the four magnet attaching surfaces 22a-22d in the circumferential direction and wherein the four pairs of magnet members 41a, 42a to 41d, 42d are juxtaposed on the respective magnet attaching surfaces 22a-22d of the magnet yoke 22. The shape of the magnet yoke 22 is not limited to the shape of a regular tetragon or a tetragon. In a further modified form, for example, there may be used a magnet yoke of a hexagon or octagon in cross-section which has six or eight magnet attaching surfaces in the circumferential direction, and at least one pair of magnet members are juxtaposed on each of the six or eight magnet attaching surfaces in such a manner that as described above, the at least one pair of magnet members are opposite in polarity of magnetic pole to another pair of magnet members arranged on each of the magnet attaching surfaces next thereto in the circumferential direction.

Figure 7:
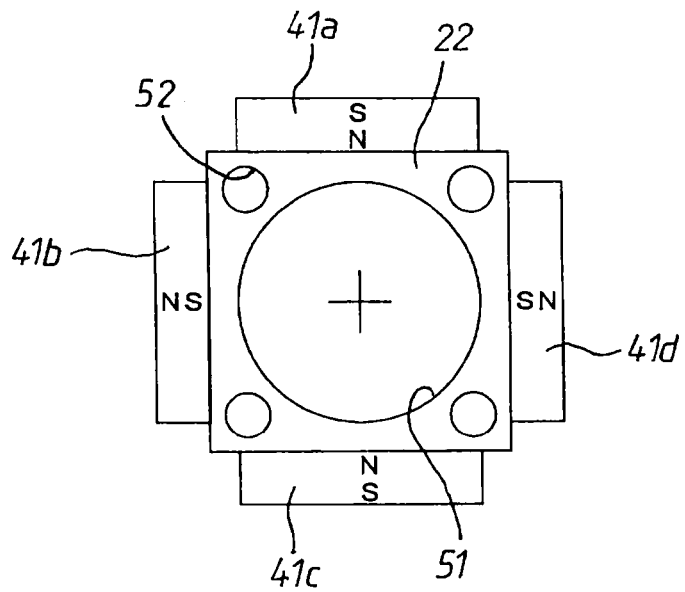
FIG. 7 is a schematic cross-sectional view showing a moving part of a linear motor in another modification according to the present invention.

Further, in another modified form, as shown in FIG. 7, the magnet yoke 22 may take a cross-section shape that is a tetragon and that is provided with a large cylindrical hollow 51 at its center portion and small through holes 52 for weight reduction at its four corners. Further, the cross-section of the magnet yoke 22 is not limited to the square shape, and in a further modified form, may be hollow cylindrical, wherein four pairs of arc-shape magnet members 41a, 42a to 41d, 42d are arranged at an equiangular distance on the circumferential surface of the magnet yoke 22 with a space between each pair and another pair next thereto in the circumferential direction.

Further, in the foregoing embodiment, description has been made taking an example wherein the auxiliary magnet 43a, 43b, 43c or 43d is arranged between each pair of the magnet members 41a, 42a; 41b, 42b; 41c, 42c or 41d, 42d which are juxtaposed in the X-axis direction. However, the auxiliary magnets 43a-43d are not necessarily required. That is, in a further modified form, each pair of the magnet members 41a, 42a; 41b, 42b; 41c, 42c or 41d, 42d may be juxtaposed with a space therebetween instead of providing the auxiliary magnet 43a, 43b, 43c or 43d.

Although in the foregoing embodiment, the displacement amount of the movable body 25 is detected by the linear scale 33, another displacement detector may be used in place of the linear scale 33.

Various features and many of the attendant advantages in the foregoing embodiment will be summarized as follows:

In the linear motor 10 in the foregoing embodiment typically shown in FIGS. 1 and 3, each of the magnet constructs 21a-21d attached to the magnet yoke 22 in the circumferential direction comprises at least one pair of magnet members 41a, 42a; 41b, 42b; 41c, 42c or 41d, 42d juxtaposed in the moving direction of the magnet yoke 22 and arranged with their polarities of magnet pole being opposite to each other. Each magnet member (e.g., 41a or 42a) in each of the first and second rows is arranged to be opposite in polarity of magnet pole to another magnet member (e.g., 41b or 42b) next thereto in the circumferential direction. Thus, the magnetic flux generated with the supply of electric current to each coil 31 is branched in two directions along the circumferential surface of the magnet yoke 22 as well as in a direction normal to the two directions, so that the magnetic flux passing through the magnet yoke 22 can be distributed into three (e.g., $\phi 1$-$\phi 3$). Therefore, the magnet yoke 22 can be made to be thin in thickness, and thus, the linear motor 10 can be downsized and lightened though it is of the moving-magnet type.

Also in the linear motor in the foregoing embodiment typically shown in FIGS. 2 and 3, since the magnet yoke 22 takes the form of a tetragon having the four magnet attaching surfaces 22a-22d in the circumferential direction, the same effects as mentioned above can be attained in a simplified configuration employing the fewer number of magnet members.

Also in the linear motor in the foregoing embodiment typically shown in FIG. 4, since each of the coils 31 (31a-31d) takes the shape of a loop over an associated one pair of the magnet members (e.g., 41a, 42a), magnetic force lines are generated from each magnet member with supply of electric current to the coils 31, and the propelling force can be given to the movable body 25.

In the foregoing embodiment typically shown in FIGS. 1 and 3, the tool moving device 20 is provided with the movable body 25 composed of the movable magnet yoke 22 taking the hollow shape and the support portions 23, 24 provided at opposite end portions of the magnet yoke 22, the support frame 27 supporting the movable body 25 to be movable relative thereto, the fluid bearings 29, 30 provided in the support frame 27 and supporting the opposite end support portions 23, 24 of the movable body 25 through a static pressure of fluid, the plurality of magnet constructs 21a-21d attached to the circumferential surface of the magnet yoke 22 at the equiangular distance, the coil yokes 32 attached to the support frame 27, the plurality of coils 31 attached respectively to the coil yokes 32 and arranged to respectively face the plurality of magnet constructs 21a-21d, the displacement detector 33 for detecting the moving displacement of the movable body 25, and the tool holder unit 26 attached to the movable body 25. Since the plurality of magnet constructs 21a-21d take the same construction as those in the aforementioned linear motor 10, the magnetic flux passing through the magnet yoke 22 can be branched into three (e.g., ($\phi$1-$\phi$3), and the magnet yoke 22 can be made to be thin in thickness. Therefore, it can be accomplished to downsize and lighten the tool moving device 20.

Obviously, numerous further modifications and variations of the present invention are possible in light of the above teachings. It is therefore to be understood that within the scope of the appended claims, the present invention may be practiced otherwise than as specifically described herein.

What is claimed is:

1. A linear motor comprising:
   a movable magnet yoke taking a hollow shape;
   a plurality of magnet constructs attached to a circumferential surface of the magnet yoke at an equiangular distance;
   coil yokes, wherein the magnet yoke is movable relative to the coil yokes; and
   a plurality of coils attached respectively to the coil yokes and arranged to respectively face the plurality of magnet constructs; and wherein:
   each of the magnet constructs comprises
      at least one pair of magnet members juxtaposed in the moving direction of the magnet yoke and arranged with their polarities of magnet pole being opposite to each other, the poles of the pair of magnet members of each magnet construct being arranged such that lines of magnetic force extend through the magnet yoke between the pair of magnet members of each magnet construct, and
      an auxiliary magnet interposed between the magnet members of each of said pairs of magnet members and having poles arranged to prevent lines of magnetic force passing between the pair of magnet members from diffusing;
   respective pairs of the magnet members attached to the circumferential surface form first and second rows spaced from each other in the moving direction of the magnet yoke;
   each magnet member in the first row is arranged to be opposite in polarity of magnet pole to each of the magnet members next thereto in the circumferential direction, and the poles of each magnet member in the first row are arranged such that lines of magnetic force extend through the magnet yoke between each of the circumferentially adjacent magnet members in the first row and the magnet members next thereto in the circumferential direction; and
   each magnet member in the second row is arranged to be also opposite in polarity of magnet pole to each of the magnet members next thereto in the circumferential direction, and the poles of each magnet member in the second row are arranged such that lines of magnetic force extend through the magnet yoke between each of the circumferentially adjacent magnet members in the second row and the magnet members next thereto in the circumferential direction.

2. The linear motor as set forth in claim 1, wherein the magnet yoke takes the shape of a tetragon having four magnet attaching surfaces in the circumferential direction.

3. The linear motor as set forth in claim 1, wherein each of the coils takes the shape of a loop over an associated one pair of the magnet members.

4. The linear motor as set forth in claim 2, wherein each of the coils takes the shape of a loop over an associated one pair of the magnet members.

5. A tool moving device comprising:
   a movable body composed of a movable magnet yoke taking a hollow shape and support portions provided at opposite end portions of the magnet yoke;
   a support frame supporting the movable body to be movable relative thereto;
   a pair of fluid bearings provided in the support frame and respectively supporting the opposite end support portions of the movable body through a static pressure of fluid,
   a plurality of magnet constructs attached to a circumferential surface of the magnet yoke at an equiangular distance;
   coil yokes attached to the support frame;
   a plurality of coils attached respectively to the coil yokes and arranged to respectively face the plurality of magnet constructs;
   a displacement detector for detecting the moving displacement of the movable body; and
   a tool holder unit attached to the movable body; and
   wherein:
   each of the magnet constructs comprises
      at least one pair of magnet members juxtaposed in the moving direction of the magnet yoke and arranged with their polarities of magnet pole being opposite to each other, the poles of the pair of magnet members of each magnet construct being arranged such that lines of magnetic force extend through the magnet yoke between the pair of magnet members of each magnet construct, and
      an auxiliary magnet interposed between the magnet members of each of said pairs of magnet members and having poles arranged to prevent lines of magnetic force passing between the pair of magnet members from diffusing;
   respective pairs of the magnet members attached to the circumferential surface form first and second rows spaced from each other in the moving direction of the magnet yoke;
   each magnet member in the first row is arranged to be opposite in polarity of magnet pole to each of the magnet members next thereto in the circumferential direction, and the poles of each magnet member in the first row are arranged such that lines of magnetic force extend through the magnet yoke between each of the circumferentially adjacent magnet members in the first row and the magnet members next thereto in the circumferential direction; and each magnet member in the second row is arranged to be also opposite in polarity of magnet pole to each of the magnet members next thereto in the circumferential direction, and the poles of each magnet member in the second row are arranged such that lines of magnetic force extend through the magnet yoke between each of the circumferentially adjacent magnet members in the second row and the magnet members next thereto in the circumferential direction.

\* \* \* \* \*